US005478640A

United States Patent [19]

Berbner et al.

[11] Patent Number: 5,478,640

[45] Date of Patent: Dec. 26, 1995

[54] ELECTRICAL INSULATING PAPER

[75] Inventors: Heinz Berbner, Moerlenbach; Gernot Herbst, Wachenheim; Karl Ott, Plankstadt; Hans D. Zettler, Gruenstadt, all of Germany

[73] Assignee: BASF Aktiengesellschaft, Ludwigshafen, Germany

[21] Appl. No.: 235,875

[22] Filed: May 2, 1994

[30] Foreign Application Priority Data

May 4, 1993 [DE] Germany .......................... 43 14 620.1

[51] Int. Cl.$^{6}$ .......................... B32B 5/16

[52] U.S. Cl. .......................... 428/283; 428/288; 428/324

[58] Field of Search .......................... 428/283, 288, 428/324

[56] References Cited

U.S. PATENT DOCUMENTS

| | | | |
|---|---|---|---|
| 3,434,917 | 3/1969 | Kraus et al. | 428/281 |
| 4,088,620 | 5/1978 | Nihongi et al. | 260/29.4 |
| 4,271,228 | 6/1981 | Foster et al. | 428/237 |
| 4,557,969 | 10/1985 | Berbner et al. | 428/283 |
| 5,322,915 | 6/1994 | Weiser et al. | 528/163 |

FOREIGN PATENT DOCUMENTS

| | | |
|---|---|---|
| 221330 | 5/1987 | European Pat. Off. . |
| 272497 | 6/1988 | European Pat. Off. . |
| 523485 | 1/1993 | European Pat. Off. . |
| 550355 | 7/1993 | European Pat. Off. . |

*Primary Examiner*—Melvyn I. Marquis
*Assistant Examiner*—D. Aylward
*Attorney, Agent, or Firm*—Keil & Weinkauf

[57] ABSTRACT

A thermally stable electrical insulating material comprises melamine resin fibers and a polymer fibril binder with or without a synthetic resin powder and mineral fillers.

7 Claims, No Drawings

ELECTRICAL INSULATING PAPER

The present invention relates to a thermally stable electrical insulating paper that is simple and inexpensive to produce and is based on synthetic resin fibers and polymer fibrils which act as a binder for the fibers.

Insulating systems are a critical factor for the functioning and service life of alternating and direct current machines. Essential requirements of modern high voltage insulating materials for motor, generator, transformer and capacitor construction and for insulating electrical appliances are a low loss factor, even at elevated temperature, a high thermal stability, good voltage and creep current resistance, smoldering resistance, and safe protection from dielectric breakdowns.

These requirements are achieved best by sheetlike or formed insulating materials.

Existing insulating materials include for example resin-impregnated glass mats or weaves, sheetlike structures from specific blends with cellulose, films of polyesters or polyamides, and papers made of aromatic polyamides. These insulating materials generally do have good electrical and usually also mechanical properties, but they are expensive to make and consequently account for a not inconsiderable proportion of the cost of the electric machines. Some of these papers are very brittle, breaking in particular on bending. Papers from aromatic polyamides have particularly good thermal stability, but their mechanical properties, in particular the high elastic recovery, are disadvantageous in processing. Moreover, the long-term smoldering resistance leaves something to be desired.

It is an object of the present invention to provide electrical insulating materials which have good mechanical and electrical properties, are thermally stable and are inexpensive to produce.

We have found that this object is achieved by a thermally stable electrical insulating paper comprising A. 15–95% by weight of synthetic resin fibers, B. 5–85% by weight of polymer fibrils, C. 0–30% by weight of a synthetic resin powder, and D. 0–80% by weight of mineral fillers, wherein the synthetic resin fibers A are made of a melamine-formaldehyde condensation product.

The individual components of the electrical insulating paper will now be described:

A. Melamine resin fibers are particularly suitable owing to their high thermal stability and non-flammability. Their production and their properties are known, for example from DE-A-2 364 091. They are preferably produced from highly concentrated solutions of melamine-formaldehyde precondensation products by centrifugal spinning, filament withdrawal, extrusion or fibrillation. The fibers obtained are predried and perhaps oriented, and the melamine resin is cured at from 150° to 250° C. The fibers are usually from 5 to 25 μm in thickness and from 2 to 20 mm in length. Their proportion in the insulating paper is according to the invention from 15 to 95, preferably from 50 to 80, % by weight. Thermally particularly stable fibers are obtained on replacing from 1 to 30 mol % of the melamine in the melamine resin by a hydroxyalkylmelamine as described in EP-A-221 330 or EP-A-523 485. Such fibers show long-term thermostability at up to 200° C., preferably at up to 220° C. The synthetic resin fibers A generally have a specific BET surface area (measured by the method of S. Brunauer, JACS 60 [1938], 309, on fibers freeze-dried at −190° C.) of less than 1, in particular less than 0.7 [$m^2 \cdot g^{-1}$].

B. The polymer fibrils and their branched structure hold the melamine resin fibers together, not only in the ready-made paper but also in the course of the production of the paper. Polymer fibrils are ramified, fibrous polymer particles which are morphologically similar to the cellulose fibers in terms of size and shape. Their length is preferably from 0.2 to 50 mm, and their thickness is less than 5 μm, in particular from 0.01 to 1 μm, the thickness in question being that of the fine individual fibers as determined under the microscope at a magnification of 20,000×. Their specific surface area (BET) is greater than 3, in particular greater than 5, $m^2 \cdot g^{-1}$. The polymer fibrils can be made of a thermally stable thermoplastic, preferably with a softening temperature above 100° C., for example polypropylene, polyacrylonitrile, a polyester, an aromatic polyamide, a polysulfone or a polyketone, or of a thermoset, such as a polyimide or a melamine-formaldehyde condensate; finally the fibrils can also be made of cellulose. Synthetic polymer fibrils are usually produced by applying high shearing forces to short fibers or by precipitating a solution of the polymer with energy supply and with or without subsequent curing. The polymer fibril content is according to the invention from 5 to 85, preferably from 10 to 50, % by weight.

C. The electrical insulating paper contains from 0 to 30, preferably from 1 to 20, % by weight of a synthetic resin powder which acts as an additional binder for the fibers. It can be made of a curable plastic, for example an amino resin or an epoxy resin, which cures in the course of the pressing of the paper, or of a thermally stable thermoplastic, which melts in the course of pressing.

D. Suitable fillers are finely divided inorganic materials such as cement, talc, kaolin, slate powder, chalk, magnesia, carbon black, kieselguhr or mixtures thereof. Their particle size is preferably from 0.1 to 40 μm. It is also possible to use plateletlike fillers, such as mica, from 1 to 100 μm in thickness, or fibrous mineral fillers, such as glass or rock wool fibers. Fillers can be present in the electrical insulating paper in amounts of up to 80% by weight, preferably from 10 to 50% by weight.

The electrical insulating papers of the invention are produced by the processes customary in the paper industry. In a preferred embodiment the fibrous or pulverulent starting materials are slurried up in water and a dispersion is prepared with a solids content from preferably 0.1 to 10% by weight. The dispersion is applied to customary paper machines, for example long or round wire machines, where it is spread out flat and drained of the bulk of the water. The fibrils hold the melamine resin fibers together, conferring adequate initial wet strength on the paper being formed. This crude paper is then dried at from 120° to 180° C. by guiding it for example over heated rolls. It is then pressed at above 200° C. This can be done on customary smoothing rolls and/or pairs of rolls and exerting a relatively high pressure on the paper.

Any synthetic resin powder present will cure or melt and bring about an additional strengthening or consolidation of the paper. The paper can also be further consolidated by subsequent impregnating with resins, for example with epoxy, melamine, polyester, silicone, phenolic or acrylate resins or with polyimides. Suitable finishes are those based on alkylphenols, imides or silicones. It is possible to produce composite materials by laminating the electrical insulating paper with films, for example with polyimide films.

In the Examples, parts and percentages are by weight.

EXAMPLE 1

Example 1 b of EP-A-523 485 is followed to produce a melamine resin in which about 10 mol % of the melamine is replaced by 5-hydroxy-3-oxapentylamino-1,3,5-triazine. This melamine resin is spun into fibers having a length of 6 mm, a thickness of 15 μm and a specific surface area of 0.52 $m^2 \cdot g^{-1}$·70 parts of these melamine resin fibers are slurried up in water together with 15 parts of aramid fibrils (Kevlare® T-979, length of the fibrils within this range from 0.5 to 6 mm, specific surface area 7.1 $m^2 g^{-1}$). Then 15 parts of a commercial melamine-formaldehyde precondensate resin (KAURAMIN® 700 from BASF; features of a 50% strength aquerous solution: viscosity at 20° C. at once: 20–50 mPa.s; viscosity at 20° C. after 60 h: 50–80 mPa.s; pH: 8.8–9; density: 1.22 ·$g/cm^3$) are mixed in homogeneously. The suspension obtained, which has a solids content of 0.5%, is introduced into a sheet-former and the water is drained off. The paper obtained has an initial wet strength of 120 g and a thickness of 1.5 mm. It is guided over rolls and dried in the course of a residence time of 50 sec, then densified between heated smoothing rolls to a thickness of 0.7 and finally pressed in a pair of rolls at 230° C. and a pressure of 150 bar. The electrical insulating paper obtained has the following properties:

Thickness :0.25 mm

Dielectric strength (according to DIN 53 481): 35 $kV \cdot mm^{-1}$

Dielectric constant (at $10^3$ Hz and 50° C.): 2.6

Volume resistivity (according to DIN 53 482): $4 \cdot 10^{16}$ [Ω·cm]

Breaking strength (according to DIN 53 455): 420 $N \cdot cm^{-1}$

Breaking extension (according to DIN 53 455): 20%

Tear strength (according to DIN 53 515): 850 N

We claim:

1. A thermally stable electrical insulating paper comprising

A. 15–95% by weight of synthetic resin fibers,

B. 5–85% by weight of polymer fibrils,

C. 0–30% by weight of a synthetic resin powder, and

D. 0–80% by weight of mineral fillers, wherein the synthetic resin fibers A are made of a melamine-formaldehyde condensation product having a specific surface area (BET) of less than 1 ($m^2 \cdot g^{-1}$) and wherein the polymer fibrils B have a specific surface area (BET) of greater than 3 ($m^2 \cdot g^{-1}$).

2. An electrical insulating paper as defined in claim 1 wherein the melamine resin fibers A are made of a melamine resin in which from 1 to 30 mol % of the melamine is replaced by a hydroxyalkylmelamine.

3. An electrical insulating paper as defined in claim 1 wherein the filler D comprises a powder having an average particle size from 0.1 to 40 μm or platelets having an average thickness from 1 to 100 μm.

4. An electrical insulating paper as defined in claim 1, wherein the polymer fibrils B are made of a thermally stable thermoplastic with a softening temperature above 100° C.

5. An electrical insulating paper as defined in claim 4, wherein the thermally stable thermoplastic is selected from the group consisting of polypropylene, polyacrylonitrile, polyester, aromatic polyamide, polysulfone and polyketone.

6. An electrical insulating paper as defined in claim 1, wherein the polymer fibrils B are made of a thermoset.

7. An electrical insulating paper as defined in claim 6, wherein the thermoset is a polyimide or a melamine-formaldehyde condensate.

* * * * *